Sept. 23, 1969　　　　　A. R. SMITH　　　　　3,469,000

METHOD OF MAKING AN EXPOSED AGGREGATE PANEL

Filed Feb. 23, 1966

INVENTOR

Albert R. Smith

BY Bailey, Stephens and Huettig

ATTORNEYS

United States Patent Office 3,469,000
Patented Sept. 23, 1969

3,469,000
METHOD OF MAKING AN EXPOSED
AGGREGATE PANEL
Albert R. Smith, 625 Robert St., Lansing, Mich. 48910
Filed Feb. 23, 1966, Ser. No. 529,397
Int. Cl. B22b 7/22
U.S. Cl. 264—255           1 Claim

ABSTRACT OF THE DISCLOSURE

An exposed aggregate panel is made by placing an inclined plate over an unset cementitious base, placing aggregate on the plate, and vibrating the plate so that the aggregate slides off the plate onto the cementitious base. While sliding, the aggregate turns so that its flattest sides are downward and become embedded in the base, thus leaving exposed the sharper edges.

---

Figure 1:
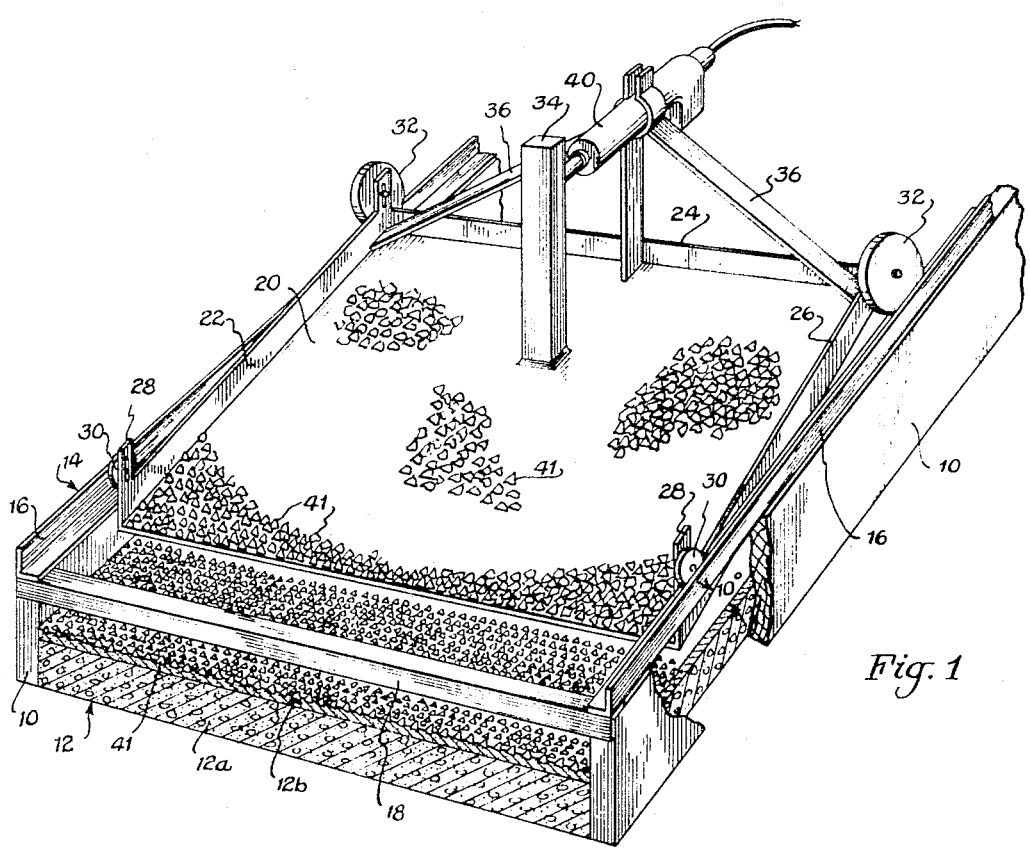

This invention relates to precast panels for building construction, and in particular relates to the method of forming an exposed aggregate panel.

Exposed aggregate panels have heretofore been made by either the face-down method or the face-up method. In the face-down method, a mixture of cement, sand and stone is poured into a form that had been previously coated with a chemical retarder and after being set the panel is turned over and the surface then washed to expose the stone to the depth the chemical has retarded the cement. In another face-down method, a sand base is laid and stones of any diameter, preferably larger than 1.5 inches, are hand-set in the sand after which a backing layer of cement is poured on the stones. After the cement has set, the sand is washed away to expose the stone.

In the face-up method, a layer of cement and stone is placed in the form and after and initial set, the panel is sprayed with a chemical retarder. Upon setting, the retarded cement is washed off to expose the aggregate. A second face-up method follows the same steps, except that, instead of using a retarder, the cement is washed away by water at exactly the proper moment in the setting cycle. The base layer can be an epoxy cement or plastic, but again, the stone is set by hand or applied by a blower spray system.

In another method, as disclosed in U.S. Patent No. 2,296,453, the stones are first sprinkled on the surface of the wet concrete, then rolled to press them into the concrete, and finally the concrete is vibrated to sink the stones into the concrete with their flattestmost sides facing upwardly.

These methods of forming exposed aggregate panels are time-consuming and expensive. Furthermore, the individual pieces of stone or aggregate which are of irregular shape generally have their flattest sides exposed. This lessens the deepness of the shadows on the face of the panel and decreases the ornamental effect of the panel.

The objects of this invention are to produce a method for quicklly forming an exposed aggregate panel by a face-up method in which the stones or aggregate are mechanically laid onto a cementitious base layer in a uniformly and evenly distributed manner, and in which the major portion of the stones have their flattest side portions embedded in and firmly keyed to the base layer and with their most angular sides exposed. By having the majority of the sharp edges exposed, an improved ornamental effect is obtained because the shadows between the stones are deepened.

In general, these objects are obtained by forming a cementitious layer and then placing the aggregate on a plate mounted above the layer. The plate is vibrated to spread the stones evenly and densely across the plate while at the same time, the stones are jiggled and turned to their most stable position, which is when the flattest sides of the stones are parallel to the surface of the plate. Vibration of the plate causes the stones to slide off onto the uncured cementitious layer so that the stones are distributed evenly thereacross in a single stone layer and with their flattestmost sides embedded in the cementitious layer. The process starts at one end of a form containing the cementitious layer and as the plate is drawn along the form, a layer of stones is quickly placed on the cementitious layer. Then before the cement cures, the stones are lightly tamped to firmly set them in the cementitious layer. Only up to one-half the thickness of each of the stones is embedded in the cementitious layer so that the sharp edge portions of the stones project or extend above the cementitious layer. The wider flatter side stone portions are keyed in. The process is quick and the use of a chemical retarder or the washing away of uncured cement from the surface of the panel is eliminated.

Figure 2:
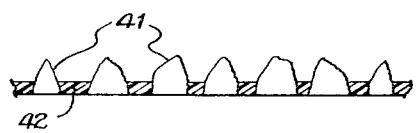

The means by which the objects of the invention are obtained are described more fully with reference to the accompanying drawings in which:

FIGURE 1 is a perspective view of an apparatus for performing the method of forming the exposed aggregate panel having a cementitious layer of hydraulic cement; and FIGURE 2 is a cross-sectional view of a panel having a cementitious layer composed of an epoxy cement.

An ordinary concrete form 10 is first laid and into which a cementitious layer 12 is placed. Layer 12 can be of concrete with such reinforcing as desired, or of an epoxy cement or the like. As shown in FIGURE 1, layer 12 is composed of a concrete backing layer 12a and a cement grout matrix layer 12b. On top of the form is placed a frame 14 which consists of angle irons 16 which form tracks connected at their ends by crossbeams 18. Slidably supported by the tracks 16 is a plate 20 composed of sheet metal which has three sides walls 22, 24 and 26. The plate is inclined by means of a first pair of brackets 28 at the front end of plate 20 to which are adjustably fixed rollers 30 riding on the tracks 16. The other end of the plate has larger rollers 32 riding on track 16. Preferably the rollers 30 and brackets 28 are adjusted so that the front edge of the plate 20 will be about ¼ of an inch above the layer 12b. A metal post 34 is welded to the upper surface of plate 20. Struts 36 are secured to the end of the plate between wheels 32 for holding an air hammer or vibrator 40 for striking post 34.

In operation, the cementitious layer 12 is first placed in the form 10. Stone or aggregate 41 is then shoveled onto or dumped on top of the rear end of plate 20 and the plate vibrated by the air hammer 40. This causes the stone to jiggle and spread evenly across the surface of the plate 20 in a single layer and with the stones turned so that the flattest portions of the individual stones lie against the surface of the plate. The plate is then drawn from one end of the form toward the other end of the form and the aggregate slides off the plate onto the surface of the unset cementitious layer 12 with the flattest sides of the stones being embedded in the layer. After the aggregate has been deposited, the stones are lightly tamped so that not more than one-half of each stone is embedded in the layer. The sharp edges of the stones are left exposed. The concrete is then cured to form the completed panel.

In the form of the invention shown in FIGURE 2, a cementitious layer 42 composed of an adhesive such as epoxy cement is laid in a form. The stones 41 are then deposited on the layer 42 as in FIGURE 1. In this case, the stones sink substantially into the layer 42 so that the layer must be thinner than the thickness of the smallest stone. Then the stones are patted with a rubber float to even or level the stones.

The invention is further described with reference to the following examples:

EXAMPLE 1

A wood form 10 was first placed over a smooth concrete casting bed which had been coated with a mold release agent, the form being such to make a panel having a size of 5 feet wide x 21 feet long x 4 inches thick. A steel reinforcing mat was laid in the form. A backing layer of 3,000 lb. per square inch mix concrete was vibrated into the mold and screeded off at a depth of 2½ inches. This concrete had a maximum slump of 4 inches to prevent the presence of excess water. A matrix layer of a 3,000 lb. per square inch sand-cement grout with a maximum slump of 4 inches was laid on the concrete layer with a thickness of 1 inch and then carefully screeded off to be ½ inch below form 10. Immediately thereafter, the plate 20 was placed on the tracks 16 and inclined at an angle of 10° to the horizontal. The front edge of the plate was ¼ inch above matrix layer 12b. The metal pan or plate 20 was of 18 gauge. Quartz stone having a size from 0.75 inch to 1.25 inches was then placed on the upper side of the plate. The air hammer was then operated at a speed of 3,500 impact per minute with a ½ inch stroke to strike the post 34 and vibrate the plate. As the stone jiggled and turned and moved toward the lower front end of the plate, the plate was moved slowly along the tracks 16 so that the stone vibrated off the plate and slid onto the matrix 12b as a single even layer with the flattest sides of the stones embedded in the matrix. Before the matrix or concrete cured, the stone was gently tamped to ensure that about one-half of each stone was in the matrix. The cementitious layer 12 was then cured to complete the panel.

EXAMPLE 2

An epoxy cement was first placed as the cementitious layer 42 in the form 10 to a depth of one-half the size of the largest stone to be embedded, and in this case, to a depth of 0.625 inch. The stone 41 was then applied to the upper surface of the cement as in Example 1. The stone sinks through the cement and is embedded therein. The upper part of the stone remains exposed. After being deposited in the cement, the stone was patted with a rubber float and then the epoxy cement was cured to form the finished panel.

Having now described the means by which the objects of the invention are obtained,

I claim:

1. A method of making an exposed stone aggregate panel comprising pouring into a mold an unset cementitious layer of such consistency that stone aggregate will at least partially sink into said layer, depositing the stone aggregate on an inclined plate mounted above said cementitious layer, vibrating said plate to distribute the stone aggregate evenly across the surface of said plate and to turn the individual pieces of stone so that the major portion of said pieces have substantially flat sides contacting said plate, causing relative movement between said plate and said cementitious layer, sliding said stone aggregate from the vibrating plate onto said cementitious layer to embed the substantially flat sides of the stone aggregate in said layer and with the opposite sides exposed, gently pressing the stone aggregate to ensure that each stone is embedded sufficiently in said layer, and then curing said layer to form the finished panel.

References Cited

UNITED STATES PATENTS

| 536,993 | 4/1895 | Allen | 264—256 X |
|---|---|---|---|
| 2,592,882 | 4/1952 | Fisher et al. | |
| 3,097,080 | 7/1963 | Weir. | |
| 3,208,578 | 9/1965 | Odell. | |
| 1,857,340 | 5/1932 | Wyatt | 117—20 |
| 2,296,453 | 9/1942 | Saffert | 264—69 X |
| 2,661,303 | 12/1953 | Fasold et al. | 117—32 X |
| 3,012,901 | 12/1961 | Reese | 264—70 X |
| 3,170,808 | 2/1965 | Almy et al. | 117—20 |

ROBERT F. WHITE, Primary Examiner

J. H. SILBAUGH, Assistant Examiner

U.S. Cl. X.R.

25—41, 103; 264—69, 256